United States Patent

[11] 3,626,326

[72] Inventors Ralph F. Wuerker
 Palos Verdes Estates;
 Robert A. Briones, Granada Hills, both of Calif.
[21] Appl. No. 883,214
[22] Filed Dec. 8, 1969
[45] Patented Dec. 7, 1971
[73] Assignee TRW, Inc.
 Redondo Beach, Calif.

[54] TIME-VARIABLE REFLECTIVITY LASER ACTUATING CIRCUIT
 16 Claims, 3 Drawing Figs.

[52] U.S. Cl. .................................................. 331/94.5
[51] Int. Cl. .................................................. H01s 3/09
[50] Field of Search .................................... 331/94.5; 350/160

[56] References Cited
UNITED STATES PATENTS
3,521,069 7/1970 De Maria et al. ............. 250/199

Primary Examiner—William L. Sikes
Attorneys—Daniel T. Anderson, Alfons Valukonis and Edwin A. Oser ABSTRACT: In a time-variable reflectivity laser of the type having a cavity, total reflection mirrors at the ends of the cavity, a ruby rod in the cavity for emitting radiation, a xenon lamp for pumping the ruby rod, a Glan polarizer in the cavity, a cell having electrodes in the cavity for changing the polarity of light, and apparatus for energizing the energy source and for energizing and deenergizing the cell in a predetermined sequence to discharge light from the cavity. The energizing apparatus consists of a trigger generator and a voltage source connected to the trigger generator and the energy source for pumping the ruby rod in response to the output from the trigger generator to establish a condition of excited atoms in the rod. Provided also is a DC voltage source, and a series circuit arrangement including a pair of resistors, a capacitor, and a discharge resistor, connecting the DC voltage source to the cell electrodes for charging the electrodes to a DC voltage to change the polarization of light within the cavity and to establish reduced reflectivity within the cavity. A delay circuit connected to the trigger generator is provided for generating a delayed-output signal. A thyratron tube circuit, which is responsive to the delayed output of the delayed circuit is utilized to short a portion of the circuit and to discharge the cell electrodes through the discharge resistor to thus deenergize the cell and to establish light amplification within the cavity. A spark gap is utilized to short another portion of the circuit when exposed to energy leaking from the cavity at its peak amplified value to discharge the capacitor through the discharge resistor and to establish a DC voltage across the electrodes of the cell to change the polarization of light within the cavity and to discharge the light energy at its peak amplified value from the cavity. A roof assembly consisting of mirrors positioned for movement with respect to one of the total reflection mirrors of the cavity for varying the length of the path of light leaked from the cavity and its transit time to the spark gap.

Ralph F. Wuerker
Robert A. Briones
INVENTORS

Ralph F. Wuerker
Robert A. Briones
INVENTORS

BY
Alfons Valahunio
AGENT

TIME-VARIABLE REFLECTIVITY LASER ACTUATING CIRCUIT

BACKGROUND OF THE INVENTION

1. Field of the Invention

This invention relates generally to time-variable reflectivity lasers and more particularly to circuits for actuating time-variable reflectivity lasers.

2. Description of the Prior Art

Time-variable reflectivity cavity-dumping techniques have been developed as a means of generating light pulses having nanosecond time durations. The pulses are shorter than can be generated by conventional Q-switch lasers and are on the order of the duration of the light transit time in the optical cavity.

Time-variable reflectivity techniques are based upon first applying a voltage bias to an electro-optical cell to rotate the polarization of radiation in the laser cavity such that the energy is diverted in a direction by a polarizer to produce a high-loss condition within the cavity while the laser rod is being pumped. The voltage bias is then removed from the electro-optical cell allowing the radiation within the cavity to build up to a maximum level as it is reflected between 100-percent reflective mirrors located at the ends of the cavity. The voltage bias is again applied to the electro-optical cell to rotate the plane of polarization of the light in the cavity such that the polarizer in the cavity now diverts the energy out of the cavity at its peak amplified value. The second application of a biasing voltage on the electro-optical cell must be very rapid, faster than the light transit time in the cavity. Without this second application of a biasing voltage to the electro-optical cell, the apparatus would be a conventional Q-switched or giant pulse laser. Pulse duration is thus determined by the radiation decay time within the optical cavity, and its length.

Some prior art devices utilized large radar hydrogen thyratrons in the switching circuit but were unsuccessful in accomplishing the desired results because of the excessive jitter time that this type of thyratron has.

Another approach utilized a photodiode to monitor the level of radiation in the laser optical cavity, and complex electronic circuitry for applying the biasing voltages to the electro-optical cell.

This invention provides for a cavity-dumping or time-variable reflectivity actuating circuit which does not require a photo tube or complex electronic circuitry for its operation. The electro-optical cell biasing circuit of this invention is simple, having very little inductance, thus making possible switching times which are faster than those achieved by any of the other techniques hereto used. Moreover, provision is made for adjusting the distance that the leaked light from the end mirror of the laser must travel, thus making possible variable control of the time delay between the firing of a spark gap utilized in the circuit and the level of radiation in the laser cavity to ensure the discharge of laser energy at its peak amplified value from the laser cavity. Accordingly, the circuit of the present invention is self-adjusting and eliminates most of the complex circuitry of the prior art devices.

SUMMARY OF THE INVENTION

In a time-variable reflectivity laser of the type having a cavity, total reflection members at the ends of the cavity, laser means in the cavity for emitting radiation, energy source for pumping the laser means, light-polarizer means in the cavity, cell means having electrodes in the cavity for changing the polarity of light, and means for energizing the energy source and for energizing and deenergizing the cell means in a predetermined sequence to discharge light. The energizing means is provided with a trigger generator and a voltage source connected to the trigger generator and the energy source for pumping the laser means in response to the trigger generator output to establish a condition of excited atoms in the rod. Provided, also, is a DC voltage source and a circuit connecting the DC voltage source to the capacitor means and the electrodes for charging the cell electrodes to a DC voltage to change the polarization of light within the cavity and to establish reduced reflectivity within the cavity, the circuit comprising a series arrangement of a pair of resistors, a capacitor, and a discharge resistor. A delay circuit is connected to the trigger generator providing a delayed output. A first means which is responsive to the delayed output is utilized for shorting a portion of the circuit to discharge the cell electrodes through the discharge resistor to deenergize the cell means and to establish light amplification within the cavity. A second means is employed for shorting another portion of the circuit when exposed to energy leaking from the cavity at its peak amplified value to discharge the capacitor through the discharge resistor and to establish a DC voltage across the cell electrodes to change the polarization of light within the cavity and to discharge the light energy at its peak amplified value from the cavity. Also provided is a means for exposing the second shorting means to energy leaked from the cavity at its peak amplified value.

BRIEF DESCRIPTION OF THE DRAWINGS

FIG. 1 is a partly schematic and partly block diagram showing of another embodiment of the invention.

DESCRIPTION OF THE PREFERRED EMBODIMENTS

Figure 1:
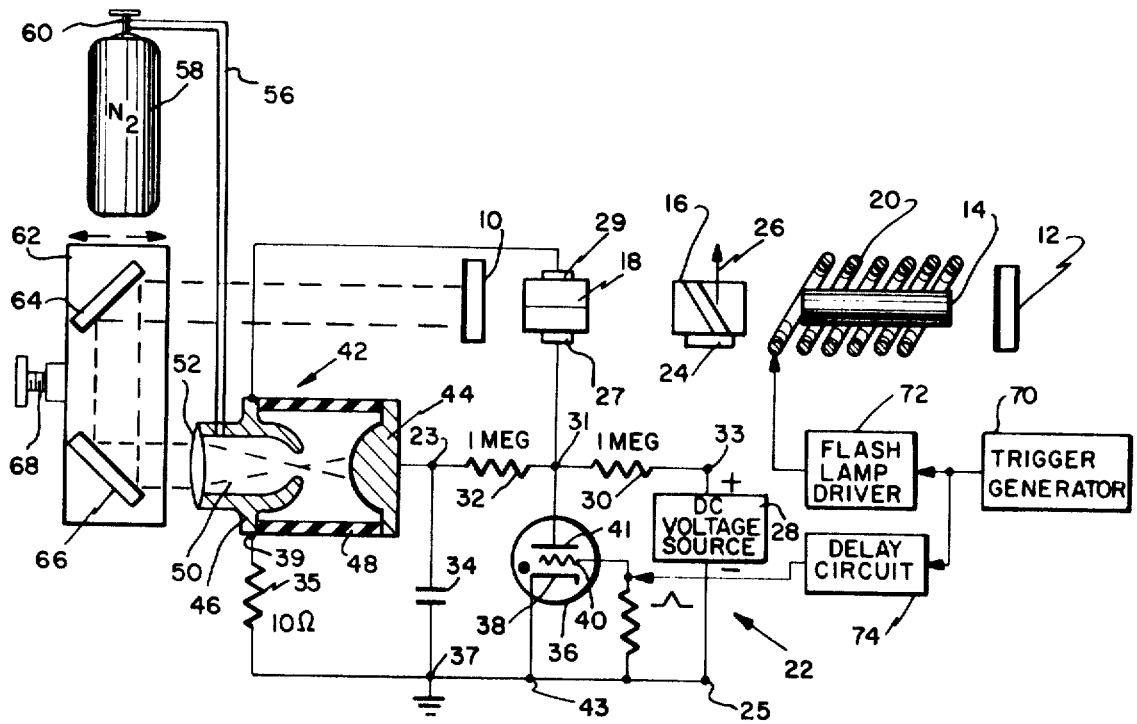
FIG. 1 is a partly schematic and partly block diagram showing of one embodiment of the invention.

Referring now to FIG. 1 there is shown a laser apparatus of the present invention for producing coherent radiation according to time-variable reflectivity principles. The laser is similar to the laser revealed and described in U.S. application Ser. No. 686,076, filed Nov. 28, 1967, and entitled "Laser with Combined Q-switch and Synchronized Cavity Dump Circuit," which generally comprises a pair of mirrors 10 and 12 defining a resonant cavity. Positioned within the cavity is a laser rod 14, a polarizer 16, and an electro-optical member 18. A flashlamp 20 is provided for pumping the rod 14. Positioned outside the cavity is a laser actuator apparatus, generally designated by the numeral 22 for actuating the lamp 20 and the electro-optical member 18.

The rod 14 can be a ruby. The opposite ends of the rod 14 are directed toward the reflecting surfaces of the mirrors 10 and 12 with the rod having its longitudinal axis perpendicular to the mirrors. For regeneration of the excited atoms in the laser rod 14, the output beam therefrom is confined along its longitudinal axis and is polarized in the direction normal to the axis of the rod. The direction of polarization of the laser radiation is determined by the orientation of the polarizer 16. For the polarizer shown in FIG. 1, the direction of the polarization of the laser radiation is horizontal, or in the plane of the drawing. Adjacent to the rod 14 is positioned the flashlamp 20 which can be a xenon flash tube, for example.

The mirrors 20 and 12 are positioned parallel to each other and are substantially 100 percent reflective. The polarizer 16 and the electro-optical member 18 are in axial alignment with the laser rod 14. The laser cavity between the mirrors 10 and 12 has a length of approximately 1 meter. All of the flat surfaces within the cavity except the mirrors 10 and 12 can be antireflection coated.

The polarizer 16 acts to send radiation in a particular direction, depending on the polarity direction of the radiation. The polarizer may be a Glan polarizer and fashioned from a material such as calcite. The polarizer 16 has a shield or absorber 24 on one side which prevents the admission of light from that side.

Radiation which is coming toward the polarizer 16 from the right or in other words from the direction of the laser rod 14, passes undiverted through the polarizer 16 is such radiation is horizontally polarized, but is diverted into the absorber 24 if such radiation is vertically polarized. Radiation which is approaching the polarizer 16 from the left, or, in other words, from the direction of the mirror 10, also passes undeviated through the polarizer if such radiation is horizontally polarized but is diverted in the output direction 26 if such radiation is vertically polarized.

The electro-optical member 18 which has electrodes 27 and 29 acts as a polarization rotator, when energized, and is effective to rotate the direction of the polarization of the polarized radiation through predetermined angles depending upon the voltage applied. When the electro-optical member 18 is not energized it does not affect the polarity of the laser radiation. The electro-optical member 18 may be a Pockels cell and is in axial alignment with both the rod 14 and the polarizer 16. Thus, when there is no voltage on the Pockels 18 cell an undeviated transmission of laser radiation takes place through the Pockels cell and the polarizer 16. When the Pockels cell 18 is energized, the path of the polarized radiation is controlled by the rotation at the Pockels cell such that it is diverted by the polarizer 16 in the output direction 26. The Pockels cell 18 may be energized with either a positive voltage or a negative voltage, and the effect of the Pockels cell on the polarized laser radiation is the same. In other words, the laser radiation can be diverted by the polarizer 16 in the output direction by the application of either a positive voltage or a negative voltage.

In accordance with the time-variable reflectivity principles of this embodiment of the invention there occurs a high cavity loss interval when the Pockels cell is positively biased, a laser radiation buildup interval when the Pockels cell is unbiased, and an output interval for cavity dumping with the Pockels cell negatively biased.

The actuating apparatus 22 is provided with a DC voltage source 28, and a series circuit arrangement consisting of a pair of similar resistors 30 and 32, capacitor 34, and discharge resistor 35. One end of the resistor 30 is connected at 33 to the positive terminal of the voltage source 28. The negative terminal of the voltage source 28 is connected at 25 to ground. The other end of the resistor 30 is connected to one end of the resistor 32 at 31 and the other end of the resistor 32 is connected to one side of the capacitor 34. The other side of the capacitor 34 at 23 is connected to one end of the discharge resistor 35 at 37, and the other end of the resistor 35 is connected through an electrode 46 of a spark gap 42 to the electrode 29 of the Pockels cell at 18. The other electrode 29 of the cell 18 is connected to the connection 31. The capacitor 34 and resistor 35 are of such value as to provide an RC time constant substantially greater than twice the light transit time between the mirrors 10 and 12. Thus, for a resistor 35 which has a value of 10 ohms, the capacitor 34 could have a capacitance value:

$$C > 333 \mu\mu f$$

where the distance between the mirrors 10 and 12 is one meter, and the light transit time therebetween is 10/3 nanoseconds.

A hydrogen thyratron tube 36 (Kuthe 6587-50) has its plate 41 connected to the connection 31. The thyratron cathode 38 is connected at 43 to ground and to the negative terminal of the voltage source 28, and a grid 40 is adapted to be actuated by a signal to short a portion of the series circuit including the resistor 32 and capacitor 34, as will hereinafter be more fully explained.

The two-element high-voltage spark gap, generally designated by the numeral 42 has one of its electrodes 44 connected to the connection 23. The other electrode 46, which is separated from the electrode 44 by a dielectric cylindrical member 48, is provided with an aperture 50 and a lens 52 at one end thereof for focusing light on the first electrode 44. The spark gap 42 serves to short a portion of the series circuit including the capacitor 34 and discharge resistor 35, as will hereinafter be more fully described. A gap of 7.15 millimeters is established between the electrodes 44 and 46.

A fluid conduit 56 has one end positioned through the wall of the second electrode 46 to open into the aperture 50, and its other end connected to a source of nitrogen under pressure 58 through a valve member 60. The pressure of nitrogen supplied to the spark gap is on the order of 3 lbs./in.²

A roof arrangement 62 consisting of mirrors 64 and 66 each positioned at 45° with respect to the incident light beam is provided. The assembly 62 serves to direct light leaking from the mirror 10 to the lens 52 and is adjustable, as by means of a suitably arranged screw assembly 68, to regulate the length of the path over which the light travels and its transit time to the spark gap 42.

A trigger generator 70 provides a signal to a flash lamp driver 72 for pumping the lamp 20 to excite the atoms in the rod 14. A delay circuit 17 connected to the trigger generator 70 provides a delayed signal to the grid 40 of the tube 36.

Operation of the laser apparatus of FIG. 1 is as follows: Initially a voltage on the order of +8 kv. is applied by the DC voltage source 28 to the electrodes 27 and 29 of the Pockels cell 18 which biases the Pockels cell 18 such that rotation of the polarization of radiation emanating from the rod 14 is such that a high energy loss condition is established within the laser cavity. In this condition laser radiation emanating from the rod 14 is diverted by the polarizer 16 into the absorber 24. Next, the trigger generator 70 is actuated to provide a signal which causes the flashlamp driver 72 to energize the lamp 20 to start nonregenerative pumping or irradiating of the atoms in the rod 14. The number of excited atoms in the rod 14 reaches a maximum within a few hundred microseconds. The trigger signal is delayed by the delay circuit 74 for a time which is equal to the time it takes for the number of excited atoms to reach a maximum whereupon it is applied to the grid 40 of tube 36 causing the tube to conduct heavily, plate 41 and the electrodes 27 and 29 of the Pockels cell to discharge through the resistor 35 and go quickly from +8 kv. to 0. With the voltage thus removed from the Pockels cell 18, an undeviated transmission of radiation takes place through the polarizer 16 and the Pockels cell to the mirrors 10 and 12 such the lasing begins to take place in the cavity, and the radiation energy starts to build up within a frequency range including the characteristic frequency of the lasing atoms in the rod 14.

A short interval occurs before the radiation energy within the cavity reaches a significant level, after which the level rapidly rises to its peak intensity. That is, photons are emitted from the laser rod 14 and make many traversals within the cavity through the rod 14 and between the mirrors 10 and 12, passing through the Pockels cell 18 and the polarizer 16 without deviation. As the energy builds up, the population of the excited atoms rapidly decreases. The power leaking through the mirror 10 builds up at the same rate as the energy within the cavity. Light from the end mirror 10 is guided by the mirrors 64 and 66, and focused by the lens 52 on the electrode 46, through the aperture 50 therein, and on the far electrode 44. When the energy within the laser cavity becomes a maximum, a spark breakdown condition is created which fires the gap of the spark gap 42. Firing of the gap creates a shorting condition across the portion of the circuit including the capacitor 34 and resistor 35 and results in a discharge of the capacitor 34 through the resistor 35. Discharge of the capacitor 34 rebiases the Pockels cell 18 but now the electrodes 27 and 29 are of reversed polarity, that is, the electrode 27 now is at ground potential and the electrode 29 is +8 kv. With the application of the aforementioned bias voltage the polarization of the laser light in the cavity is rotates such that it is drained out of the cavity through the polarizer 16 and out along the path 26. Simple adjustment of the screw member 68 can position the assembly 62 such that the spark gap 42 is precisely fired at the peak amplified value of radiant energy within the cavity. The radiation output pulse has a duration on the order of 6 to 7 nanoseconds.

Figure 2:
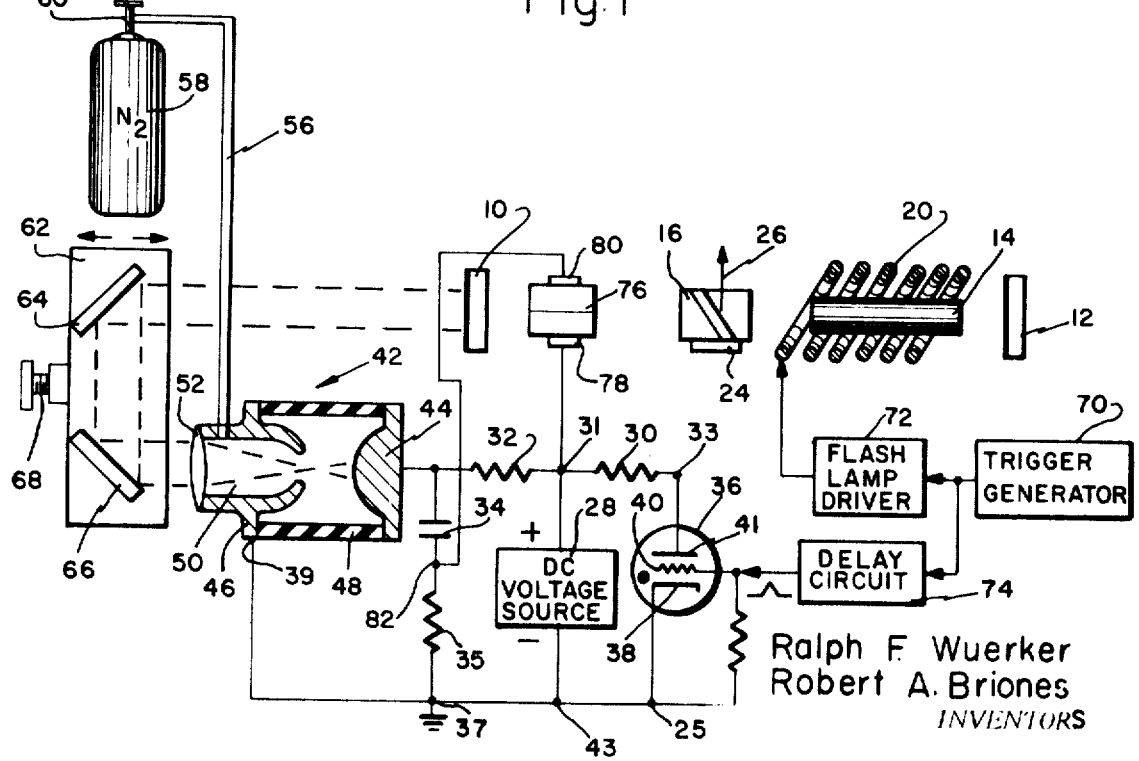

Referring to FIG. 2, there is shown still another embodiment of the invention. The apparatus of FIG. 2 is somewhat similar to the apparatus of FIG. 1, and like numerals designate like element, but differs in that a Kerr cell 76 having electrodes 78 and 80 is utilized instead of a Pockels cell. Also, the DC voltage source 28 and the thyratron 36 are reversed in position, that is, the DC voltage source 28 has its positive terminal connected to the connection 31 and its negative terminal connected to the connection 43, and the plate 41 of tube 36 is connected to the one end of resistor 30 at 33. The resistor 35 is repositioned such that one end is connected at 37 to ground and the other end is connected to the capacitor 34 at 82. Another change is that the electrode 80 of the Kerr cell is connected to the connection 82.

Normally, reversal of voltage polarities across the electrodes of a Kerr cell will tend to deposit impurities in the Kerr cell liquor. Accordingly, the circuit of the apparatus of FIG. 2 is advantageous in that it is more suitable for use with a Kerr cell in that the voltage across the electro-optical cell electrodes 78 and 80 is not reversed when the capacitor 34 is discharged, as it does in the circuit of FIG. 1.

In operation, as before in the embodiment of FIG. 1, firing of the thyratron 36 discharges the Kerr cell 76 through the discharge resistor 35. The later fusing of the spark gap 42 by the laser radiation and the discharge of the capacitor 34 rebiases the Kerr cell 76 to the original voltage, but this time the polarities are the same. Thus, in accordance with time-variable reflectivity principles of this embodiment of the invention there occurs a high cavity loss interval when the Kerr cell is positively biased, a laser build up interval when the Kerr cell is unbiased, and an output interval for cavity dumping with the Kerr cell positively biased.

Figure 3:
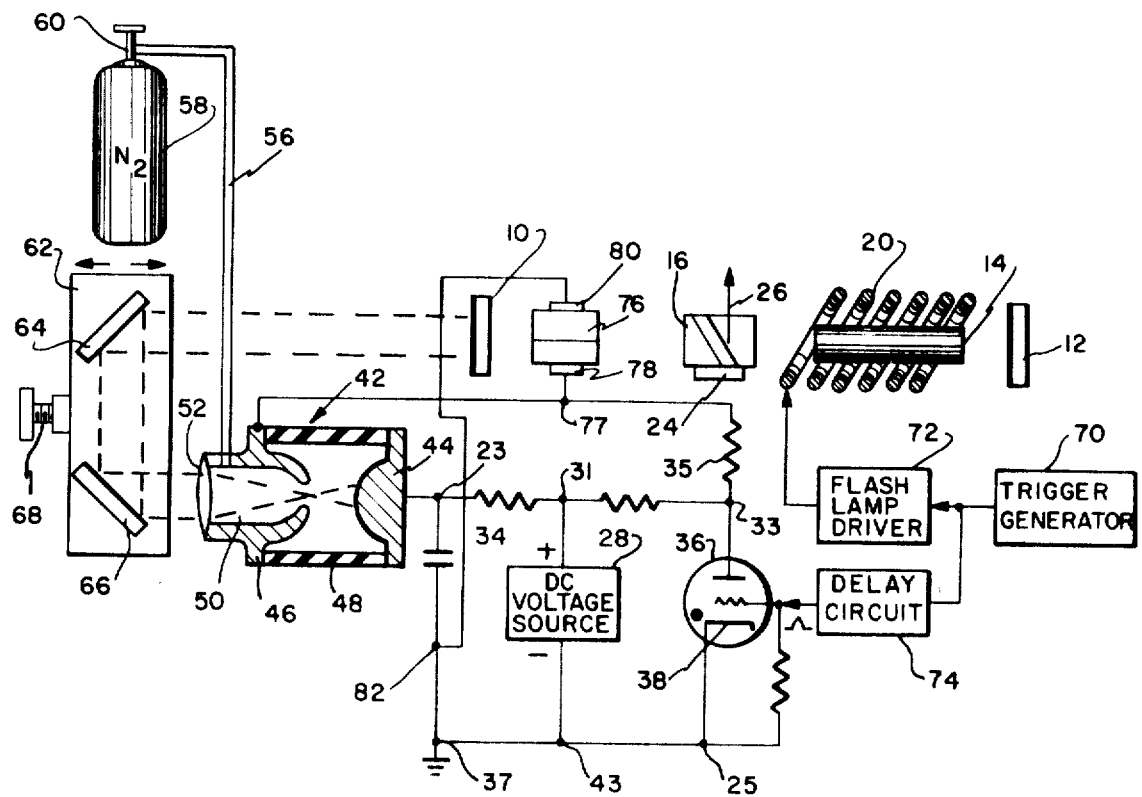
FIG. 3 is a partly schematic and partly block diagram showing of still another embodiment of the present invention.

FIG. 3 shows yet another embodiment of the invention. This embodiment differs from the embodiment of FIG. 2 in that the resistor 35 is now connected at one end to the connection 33 and at the other end at 77 to the electrode 78 of the Kerr cell 76. Also, the electrode 46 of the spark gap is connected to the connection 77. In this embodiment when the thyratron 36 is fired the Kerr cell discharges through the resistor 35. When the spark gap is later fused by radiation from the laser cavity, the capacitor 34 also discharges through the resistor 35 and the thyratron 36, thereby keeping it in a conducting state. As in the embodiment of FIG. 2 the voltage polarities of the electrodes 78 and 80 remain the same. Thus, there occurs a high cavity loss interval when the Kerr cell is positively biased, a laser buildup interval when the Kerr cell is unbiased, and an output interval for cavity dumping with the Kerr cell positively biased.

Obviously, many modifications and variations of this invention are possible in view of the above teachings. It is therefore to be understood that within the scope of the appended claims the invention may be practiced otherwise than as specifically described.

We claim:

1. An actuating circuit for a time-variable reflectivity laser of the type having a cavity with total reflection members and a cell for rotating the polarization direction of radiation generated within the cavity, said actuating circuit comprising:
   a voltage source;
   circuit means connected to said voltage source and adapted for connection to the cell for applying voltage to rotate the polarization direction of radiation within the cavity to reduce reflectivity within the cavity;
   first shorting means connected to said circuit means for shorting a portion of said circuit means to eliminate the voltage applied to the cell in response to a trigger pulse to deenergize the cell and to establish radiation amplification within the cavity;
   second shorting means connected to said circuit means for shorting another portion of said circuit means in response to radiation leaked from the cavity at its peak amplified value to apply voltage to the cell to rotate the polarization direction of radiation within the cavity to discharge radiation at its peak amplified value from the cavity; and
   means adapted for positioning adjacent one of the total reflection members and said second shorting means for exposing said second shorting means to radiation leaked from the cavity at its peak amplified value.

2. The apparatus of claim 1 wherein said circuit means comprises:
   a series arrangement of a pair of resistors, a capacitor, and a discharge resistor.

3. The apparatus of claim 2 wherein said capacitor and said discharge resistor are of such value as to provide an RC time constant substantially greater than twice the radiation transient time between the total reflection members.

4. The apparatus of claim 2 wherein said one portion of said circuit means includes one of said pair of resistors, and said capacitor.

5. The apparatus of claim 2 wherein said other portion of said circuit means includes said capacitor and said discharge resistor.

6. The apparatus of claim 2 wherein said one portion of said circuit means includes said pair of resistors, capacitor, and discharge resistor.

7. The apparatus of claim 2 wherein said other portion of said circuit means includes said capacitor and discharge resistor.

8. The apparatus of claim 2 wherein said one portion of said circuit means includes said pair of resistors, and capacitor.

9. The apparatus of claim 2 wherein said other portion of said circuit means includes said pair of resistors, and discharge resistor.

10. The apparatus of claim 2 wherein said first shorting means comprise a thyratron circuit, and said one portion of said circuit means includes one of said pair of resistors and said capacitor; and
    said second shorting means comprises a gas-pressurized spark gap having a pair of electrodes one of said electrodes being exposed to the leaked energy, and said other portion of said circuit means includes said capacitor and discharge resistor.

11. The apparatus of claim 2 wherein said first shorting means comprises a thyratron circuit, and said one portion of said circuit means includes said pair of resistors, capacitor, and discharge resistor; and
    said second shorting means comprises a gas-pressurized spark gap having a pair of electrodes, one of said electrodes being exposed to the leaked energy, and said other portion of said circuit means includes said capacitor and discharge resistor.

12. The apparatus of claim 2 wherein said first shorting means comprises a thyratron circuit, and said one portion of said circuit means includes said pair of resistors, and capacitor; and
    said second shorting means comprises a gas-pressurized spark gap having a pair of electrodes, one of said electrodes being exposed to the leaked energy, and said other portion of said circuit means includes said pair of resistors and discharge capacitor.

13. The apparatus of claim 1 wherein said first shorting means comprises a thyratron circuit.

14. The apparatus of claim 1 wherein said second shorting means comprises a gas-pressurized spark gap having a pair of electrodes, one of said electrodes being exposed to said leaked energy.

15. The apparatus of claim 14 wherein the other of said electrodes is provided with an aperture having a lens for focussing the leaked energy on said exposed electrode.

16. The apparatus of claim 1 wherein said exposing means comprises light reflecting means adapted for positioning for movement with respect to one of the total reflection members to vary the length of the path of radiation leaked from the cavity and its transient time to said second shorting means.

* * * * *